US009277230B2

(12) United States Patent  
Rabii et al.

(10) Patent No.: US 9,277,230 B2  
(45) Date of Patent: Mar. 1, 2016

(54) DISPLAY MODE-BASED VIDEO ENCODING IN WIRELESS DISPLAY DEVICES

(75) Inventors: Khosro M. Rabii, San Diego, CA (US); Sumeet Singh Sethi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 289 days.

(21) Appl. No.: 13/303,931

(22) Filed: Nov. 23, 2011

(65) Prior Publication Data

US 2013/0128948 A1    May 23, 2013

(51) Int. Cl.
| | |
|---|---|
| H04N 11/12 | (2006.01) |
| H04N 19/179 | (2014.01) |
| H04N 21/41 | (2011.01) |
| H04N 21/422 | (2011.01) |
| H04L 29/06 | (2006.01) |
| H04N 19/12 | (2014.01) |
| H04N 19/137 | (2014.01) |
| H04N 19/114 | (2014.01) |
| H04N 19/132 | (2014.01) |

(52) U.S. Cl.  
CPC ............ *H04N 19/179* (2014.11); *H04L 65/604* (2013.01); *H04N 19/12* (2014.11); *H04N 19/137* (2014.11); *H04N 21/4122* (2013.01); *H04N 21/42207* (2013.01); *H04N 19/114* (2014.11); *H04N 19/132* (2014.11)

(58) Field of Classification Search  
CPC .......................... H04N 19/0029; H04N 19/12  
USPC ..................................... 375/240.01  
See application file for complete search history.

(56) References Cited

U.S. PATENT DOCUMENTS

| | | | |
|---|---|---|---|
| 5,408,600 | A | 4/1995 | Garfinkel et al. |
| 6,046,750 | A | 4/2000 | Fitzpatrick et al. |
| 6,308,199 | B1 | 10/2001 | Katsurabayashi |

(Continued)

FOREIGN PATENT DOCUMENTS

| | | |
|---|---|---|
| EP | 2180694 A1 | 4/2010 |
| JP | H1165975 | 3/1999 |

(Continued)

OTHER PUBLICATIONS

Google patent search history log.pdf.*

(Continued)

*Primary Examiner* — William C Vaughn, Jr.  
*Assistant Examiner* — Luis Perez Fuentes  
(74) *Attorney, Agent, or Firm* — Linda G. Gunderson

(57) ABSTRACT

This disclosure relates to techniques for performing display mode based video encoding to reduce power consumption in a source device of a Wireless Display (WD) system. More specifically, the techniques enable the source device to select an encoding process based on whether the video data to be encoded is in a static display mode or a dynamic display mode. For example, when the video data is in the static display mode, the source device selects a static encoding process that reduces an amount of video data processing and compression, which in turn reduces power consumption at the source device. When the video data is in the dynamic mode, the source device may select a conventional dynamic encoding process. The source device encodes the video data according to the selected encoding process, and transmits the encoded video data to one or more sink devices in the WD system for display.

20 Claims, 7 Drawing Sheets

(56) References Cited

U.S. PATENT DOCUMENTS

| | | | |
|---|---|---|---|
| 6,385,772 B1* | 5/2002 | Courtney | 725/105 |
| 7,193,660 B2* | 3/2007 | Matsubayashi | 348/700 |
| 7,362,808 B2* | 4/2008 | Kang | H04N 19/53 375/240 |
| 7,515,634 B2* | 4/2009 | Chang | H04N 19/10 375/240 |
| 7,953,283 B2 | 5/2011 | Inoue | |
| 8,175,167 B2* | 5/2012 | Bouton et al. | 375/240.26 |
| 8,213,516 B2* | 7/2012 | Kobayashi | 375/240.21 |
| 8,416,852 B2* | 4/2013 | Matsubayashi | H04N 21/4122 375/240.16 |
| 8,649,438 B2* | 2/2014 | Li | H04N 19/00672 375/240.16 |
| 9,144,094 B2* | 9/2015 | Bhamidipati | H04N 21/42207 |
| 2002/0052222 A1* | 5/2002 | Suzuki | 455/566 |
| 2003/0017846 A1 | 1/2003 | Estevez et al. | |
| 2004/0151390 A1 | 8/2004 | Iwamura | |
| 2005/0091610 A1 | 4/2005 | Frei et al. | |
| 2005/0243922 A1* | 11/2005 | Magee et al. | 375/240.12 |
| 2005/0244066 A1 | 11/2005 | Huang et al. | |
| 2005/0283732 A1 | 12/2005 | Menadue | |
| 2007/0074266 A1* | 3/2007 | Raveendran et al. | 725/135 |
| 2008/0134271 A1 | 6/2008 | Qin et al. | |
| 2008/0214239 A1 | 9/2008 | Hashimoto et al. | |
| 2009/0044251 A1 | 2/2009 | Otake et al. | |
| 2009/0162029 A1 | 6/2009 | Glen | |
| 2009/0310038 A1 | 12/2009 | Jung et al. | |
| 2011/0025701 A1 | 2/2011 | Jain et al. | |
| 2011/0032329 A1 | 2/2011 | Bauza et al. | |
| 2011/0096230 A1 | 4/2011 | Komiya et al. | |
| 2011/0225542 A1 | 9/2011 | Schmieder et al. | |
| 2012/0027089 A1 | 2/2012 | Chien et al. | |
| 2012/0183039 A1 | 7/2012 | Rajamani et al. | |
| 2013/0148720 A1 | 6/2013 | Rabii | |
| 2014/0334381 A1* | 11/2014 | Subramaniam | H04L 65/604 370/328 |

FOREIGN PATENT DOCUMENTS

| | | |
|---|---|---|
| JP | 2006338531 | 12/2006 |
| JP | 2011044767 | 3/2011 |
| JP | 2011248761 | 12/2011 |
| KR | 20110010049 | 1/2011 |
| WO | 03027876 A1 | 4/2003 |
| WO | 2011090313 | 7/2011 |

OTHER PUBLICATIONS

International Search Report and Written Opinion—PCT/US2012/061488—ISA/EPO dated Mar. 6, 2013, 15 pp.
International Preliminary Report on Patentability from international application No. PCT/US2012/061488, mailed Apr. 4, 2014, 35 pp.
Second Written Opinion from International Application No. PCT/US2012/061488, dated Dec. 19, 2013, 11 pp.

* cited by examiner

FIG. 7

DISPLAY MODE-BASED VIDEO ENCODING IN WIRELESS DISPLAY DEVICES

TECHNICAL FIELD

The disclosure relates to coding and transmission of video data and, more particularly, control over encoding of video data.

BACKGROUND

Wireless display (WD) or Wi-Fi Display (WFD) systems include a source device and one or more sink devices. The source device sends media data, such as audio video (AV) data, audio data, and/or video data, to one or more of the sink devices participating in a particular media share session. The media data may be played back at both a local display of the source device and at each of the displays of the sink devices. More specifically, each of the participating sink devices renders the received media data on its screen and audio equipment. In some cases, a user of a sink device may apply user inputs to the sink device, such as touch inputs and remote control inputs. In the WD system, the user inputs may be sent from the sink device to the source device. The source device processes the received user inputs from the sink device and applies the effect of the user inputs on subsequent media data sent to the sink device.

The source device and each of the sink devices may be either mobile devices or wired devices with wireless communication capabilities. In one example, as wired devices, one or more of the source device and the sink devices may comprise televisions, desktop computers, monitors, projectors, and the like, that include wireless communication capabilities. In this case, battery life is not a concern as the source and sink devices are wall-plugged. In another example, as mobile devices, one or more of the source device and the sink devices may comprise mobile telephones, portable computers with wireless communication cards, personal digital assistants (PDAs), portable media players, or other flash memory devices with wireless communication capabilities, including so-called "smart" phones and "smart" pads or tablets, or other types of wireless communication devices (WCDs). WCDs are typically powered by limited battery resources. In the case of a WD system, the source device is typically responsible for processing all media data for display at the sink devices and user inputs received from the sink devices. Improved battery life and battery life conservation are, therefore, of paramount concern when designing WCDs for use as source devices in a WD system.

SUMMARY

In general, this disclosure relates to techniques for performing display mode-based video encoding to reduce power consumption in a source device of a Wireless Display (WD) system. More specifically, the techniques enable the source device to select an encoding process based on whether the video data to be encoded is in a static display mode or a dynamic display mode. For example, when the video data is in the static display mode, i.e., the video data includes static content over a period of time, the source device selects a static encoding process that reduces an amount of video data processing and compression, which in turn reduces power consumption at the source device. When the video data is in the dynamic mode, i.e., the video data includes dynamic content over a period of time, the source device may select a conventional dynamic encoding process. The source device encodes the video data according to the encoding process selected based on the display mode of the video data, and transmits the encoded video data to one or more sink devices in the WD system for display. In this way, the techniques reduce power consumption in the source device when processing static video data without sacrificing display quality of dynamic video data at the sink devices.

In one example, the disclosure is directed toward a method of encoding video data comprising determining, with a source device in a WD system, a display mode of video data to be encoded, when the display mode of the video data comprises a dynamic mode, selecting a first encoding process for the video data, when the display mode of the video data comprises a static mode, selecting a second encoding process for the video data different from the first encoding process, wherein the second encoding process reduces an amount of at least one of video data processing and compression, and encoding the video data according the selected encoding process.

In another example, the disclosure is directed toward a source device in a WD system comprising a memory to store video data, and a processor configured to determine a display mode of video data to be encoded, when the display mode of the video data comprises a dynamic mode, select a first encoding process for the video data, when the display mode of the video data comprises a static mode, select a second encoding process for the video data different from the first encoding process, wherein the second encoding process reduces an amount of at least one of video data processing and compression, and encode the video data according the selected encoding process.

In a further example, the disclosure is directed toward a source device in a WD system comprising means for determining, with the source device, a display mode of video data to be encoded, when the display mode of the video data comprises a dynamic mode, means for selecting a first encoding process for the video data, when the display mode of the video data comprises a static mode, means for selecting a second encoding process for the video data different from the first encoding process, wherein the second encoding process reduces an amount of at least one of video data processing and compression, and means for encoding the video data according the selected encoding process.

In another example, the disclosure is directed toward a computer-readable medium comprising instructions for encoding video data that cause one or more processor to determine, with a source device in a WD system, a display mode of video data to be encoded, when the display mode of the video data comprises a dynamic mode, select a first encoding process for the video data, when the display mode of the video data comprises a static mode, select a second encoding process for the video data different from the first encoding process, wherein the second encoding process reduces an amount of at least one of video data processing and compression, and encode the video data according the selected encoding process.

The details of one or more examples of the disclosure are set forth in the accompanying drawings and the description below. Other features, objects, and advantages will be apparent from the description and drawings, and from the claims.

BRIEF DESCRIPTION OF DRAWINGS

FIG. 7 is a table illustrating example power savings in a source device in a WD system using display mode based video encoding to encode video data at a source device for a 1080p display at a sink device.

DETAILED DESCRIPTION

In general, this disclosure relates to techniques for performing display mode-based video encoding to reduce power consumption in a source device of a Wireless Display (WD) system. In the WD system, the source device may comprise a wireless communication device (WCD) that is responsible for processing all audio and/or video data for display at one or more sink devices and user inputs received from the sink devices. In this case, improved battery life and battery life conservation are of paramount concern in the source device.

The techniques enable the source device to select an encoding process based on whether the video data to be encoded is in a static display mode or a dynamic display mode. The source device may receive content information regarding the video data prior to encoding, and determine the display mode of the video data based on wither the content information indicates that the video data includes static content over a period of time or dynamic content over a period of time.

When the video data is in the static display mode, i.e., the video data includes static content over a period of time, the source device selects a static encoding process that reduces an amount of video data processing and compression, which in turn reduces power consumption, e.g., battery usage, at the source device. For example, the source device may adjust video hierarchy values to reduce a number of intra-encoded video frames for the video data. The video hierarchy values include one or more of a group of pictures (GOP) size, a video sequence start position, a picture type, and a slice type. In addition, when the static encoding process is selected, the source device may inter-encode video frames of the video data as skip-mode frames without performing motion estimation. When the video data is in the dynamic mode, i.e., the video data includes dynamic content over a period of time, the source device may select a conventional dynamic encoding process. More specifically, the source device selects a dynamic encoding process and encodes the video data using intra-encoded video frames as often as necessary, and otherwise using inter-encoding video frames using motion estimation.

The source device encodes the video data according to the encoding process selected based on the display mode of the video data, and transmits the encoded video data to one or more sink devices in the WD system for display. The source device, therefore, encodes the video data using the static encoding process when the video data is in the static display mode, and encodes the video data using the dynamic encoding process when the video data is in the dynamic display mode. In this way, the techniques reduce power consumption in the source device when processing static video data without sacrificing display quality of dynamic video data at the sink devices.

Figure 1:
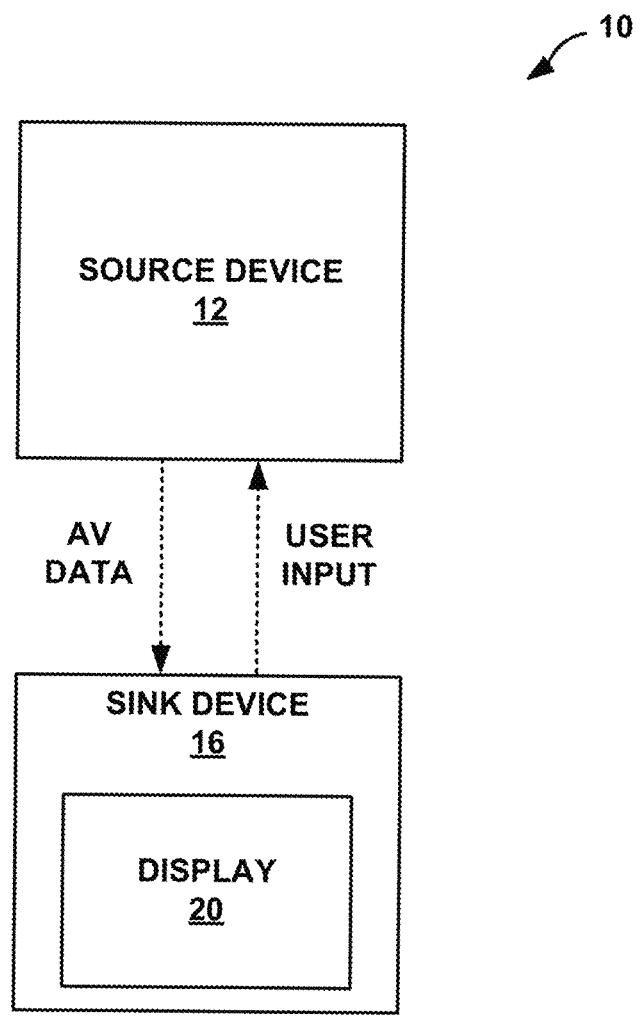
FIG. 1 is a block diagram illustrating a Wireless Display (WD) system including a source device and a sink device.

FIG. 1 is a block diagram illustrating a WD system 10 including a source device 12 and a sink device 16. In the example of FIG. 1, WD system 10 includes source device 12 and only one sink device 16. In other examples, the WD system 10 may include more than one participating sink device. The WD system 10 may also include one or more base stations (not shown) that support a plurality of Wi-Fi (e.g., IEEE 802.11x) networks over which a WD media share session is established between source device 12 and sink device 16. A communication service provider may centrally operate and administer one or more of these networks using a base station as a network hub.

According to the Wi-Fi Display (WFD) standard, source device 12 may receive a request from sink device 16 to setup a media share session. Source device 12 may establish the media share session between source device 12 and sink device 16 using the Real-Time Streaming Protocol (RTSP). Once the media share session is established, source device 12 transmits media data, e.g., audio video (AV) data, video data, and/or audio data, to the participating sink device 16 using the Real-time Transport protocol (RTP). The media data may be transmitted over the media share session, for example, using one of the existing wireless communication standards, e.g., IEEE 802.11a, 802.11g, or 802.11n improvements to previous 802.11 standards. Sink device 16 renders the received media data on its display 20 and audio equipment (not shown in FIG. 1).

A user of sink device 16 may apply user inputs on sink device 16, e.g., touch inputs via a touch display, keyboard inputs, tracking ball or mouse inputs, or remote control inputs. In some cases, the user inputs applied at sink device 16 are sent to source device 12 over a reverse channel architecture referred to as a user input back channel (UIBC). In this way, source device 12 may respond to the user inputs applied at sink device 16. More specifically, source device 12 processes the received user inputs and applies the effect of the user inputs on subsequent media data sent to sink device 16.

One or more of source device 12 and sink device 16 may take the form of mobile devices, such as mobile telephones, portable computers with wireless communication cards, personal digital assistants (PDAs), portable media players, other flash memory devices with wireless communication capabilities, including so-called "smart" phones and "smart" pads or tablets, or other types of wireless communication devices. In other examples, one or more of source device 12 and sink device 16 may take the form of wired devices with wireless communication capabilities, such as televisions, desktop computers, monitors, projectors, and the like. In some cases, source device 12 and sink device 16 are similar devices, e.g., both being smart phones, tablet computers, or the like. In this case, one device may operate as the source and the other may operate as the sink, and these rolls may even be reversed in different instances. Display 20 in sink device 16 may comprise one of a variety of display devices such as a liquid crystal display (LCD), a plasma display, an organic light emitting diode (OLED) display, or another type of display device.

WD system 10 may be especially useful in providing a convenient means of wirelessly connecting source device 12 and sink device 16 capable of creating and/or receiving video data. In this way, a user of source device 12 may be able to view video data on a large display 20 of sink device 16, such as a digital television or computer monitor, capable of providing much higher resolution than a local display of source device 12. To become a widely accepted connection standard, however, the WFD standard used by WD system 10 may need to provide quality of service similar to that of a high-definition multimedia interface (HDMI) or other "wired" connection interfaces. In addition, WD system 10 may need to provide a high quality of experience for the users of source device 12 and sink device 16. For example, source device 12 and sink device 16 may need to exchange user inputs and video data quickly enough to synchronize user interaction at sink device 16 with the local display at source device 12 and display 20 at sink device 16.

In the case where source device 12 comprises a WCD, WD system 10 also needs to provide low power consumption on source device 12 for both encoding video data for transmission and actually transmitting the encoded video data via the wireless communication channel. In order to achieve high quality of service and high quality of experience, source device 12 must perform relatively high bit-rate video encoding and transmission in a short period of time. Video encoding, however, consumes a large amount of battery power.

The amount of power consumed by source device 12 to encode and transmit video data may depend on several factors. For example, the amount of power consumed by source device 12 may depend on a user's expectations regarding quality of service and quality of experience when displaying video data received from source device 12 on display 20 of sink device 16. The amount of power consumed may depend on the audio and/or video scaling and processing required at source device 12 for the data to be appropriately rendered at sink device 16. The amount of power consumed may also depend on characteristics of the communication channel between source device 12 and sink device 16, including channel distortion levels and available bandwidth. In addition, the amount of power consumed by source device 12 may depend on the display capabilities of sink device 16. For example, source device 12 may encode video data to conform to one or more of the sound and display resolution, multi-channel audio, surround sound, and audio/video decoder within sink device 16.

The techniques described herein for reducing power consumption in source device 12 in WD system 10, therefore, are directed toward reducing an amount of video content processing and compression during the encoding process for transmission of the video data to sink device 16. More specifically, the techniques enable source device 12 to select an encoding process based on whether the video data to be encoded is in a static display mode or a dynamic display mode. Source device 12 may receive content information regarding the video data prior to encoding, and determine the display mode of the video data based on whether the content information indicates that the video data includes static content over a period of time or dynamic content over a period of time. When a static encoding process is selected, source device 12 reduces an amount of video content processing and compression performed for the video data in the static display mode.

When the video data is in the static display mode, i.e., the video data includes static content over a period of time, source device 12 selects a static encoding process that reduces an amount of video data processing and compression, which in turn reduces battery usage at source device 12. For example, source device 12 may adjust video hierarchy values to reduce a number of intra-encoded video frames for the video data. The hierarchy values include one or more of a GOP size, a video sequence start position, a picture type, and a slice type. In addition, when the static encoding process is selected, source device 12 may inter-encode video frames of the video data as skip-mode frames without performing motion estimation. When the video data is in the dynamic mode, i.e., the video data includes dynamic content over a period of time, source device 12 may select a conventional dynamic encoding process. More specifically, source device 12 selects a dynamic encoding process and encodes the video data using intra-encoded video frames as often as necessary, and otherwise using inter-encoding video frames using motion estimation.

Source device 12 then encodes the video data according to the encoding process selected based on the display mode of the video data, and transmits the encoded video data to sink device 16 for presentation on display 20. Source device 12, therefore, encodes the video data using the static encoding process when the video data is in the static display mode, and encodes the video data using the dynamic encoding process when the video data is in the dynamic display mode. In this way, the techniques reduce power consumption in source device 12 when processing static video data without sacrificing display quality of dynamic video data at sink device 16.

Video source 12 may signal in the encoded video bitstream the selected encoding process used by WD video compression unit 90 to encode the video data to sink device 16. In this way, a sink device 16 may apply a reciprocal decoding process to decode the video data for presentation on display 20. In some cases, source device 12 may receive status information from sink device 16 via an independent channel established between source device 12 and sink device 16. For example, the independent channel may comprise the UIBC or another reverse channel architecture. Source device 12 may use the received status information to adjust the selected encoding process for the video data. The received status information may include at least one of display capability profiles, display related adjustments, and display use status from sink device 16.

The display capability profile of single device 16 may include, for example, whether display 20 within sink device 16 comprises a two-dimensional display or a three-dimensional display, a resolution of display 20, and audio capabilities of sink device 16 such as audio resolution, multi-channel audio, and surround sound. The display related adjustments may include, for example, audio-video synchronization adjustments. The display use status of sink device 16 may include, for example, whether sink device 16 is on or off such that source device 12 has no need to continue processing and transmitting media data for display at sink device 16.

Figure 2:
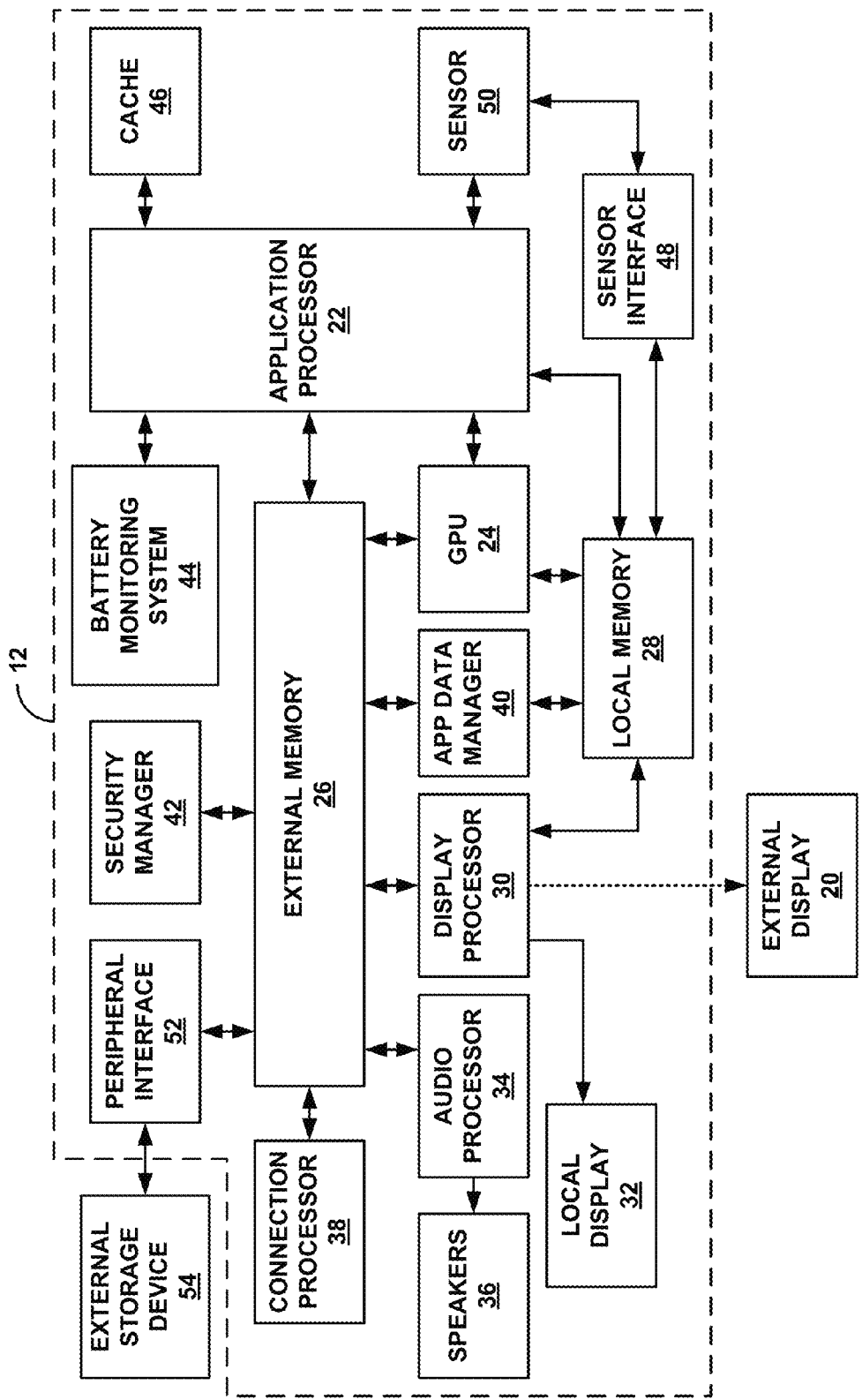
FIG. 2 is a block diagram illustrating the source device from FIG. 1 including a display processor capable of performing display mode based video encoding.

FIG. 2 is a block diagram illustrating source device 12 from FIG. 1 including a display processor 30 capable of performing display mode based video encoding. Display processor 30 may include both a local display processor to process video data for presentation on a local display 32 in source device 12, and a wireless display processor to process and encode video data for transmission to external display 20 in sink device 16 from FIG. 1. In some cases, display processor 30 may process the same video data for display on both local display 32 and external display 20. In other cases, display processor 30 may process video data for display on only one of local display 32 and external display 20.

As discussed above, source device 12 must perform relatively high bit-rate video encoding and transmission to sink device 16 in a short period of time in order to provide high quality of service and experience to users of WD system 10. Video encoding, however, consumes a large amount of battery power. When source device 12 comprises a WCD, the amount of overall battery power consumption is of paramount concern. The techniques described herein reduce battery usage in source device 12 by reducing an amount of video content processing and compression during the encoding process for transmission of video data to sink device 16.

According to the techniques, when display processor 30 is encoding video data for external display 20 in sink device 16, display processor 30 selects an encoding process based on whether video data to be encoded is in a static display mode or a dynamic display mode. For example, when the video data is in the static display mode, display processor 30 selects a static encoding process that reduces an amount of video data processing and compression, which in turn reduces battery usage at source device 12. When the video data is in the dynamic mode, display processor 30 may select a conventional dynamic encoding process. Display processor 30 encodes the video data according to the selected encoding process, and transmits the encoded video data for display on external display 20. In this way, the techniques reduce power consumption in source device 12 when processing static video data without sacrificing display quality of dynamic video data at external display 20 in sink device 16.

Source device 12 also includes an application processor, a graphics processing unit (GPU) 24, an external memory 26, a local memory 28, a local display 32, an audio processor 34, speakers 36, a connection processor 38, an application data manager 40, a security manager 42, a battery monitoring system 44, a cache 46, a sensor interface 48, sensor 50, and a peripheral interface 52 that may connect source device 12 to an external storage device 54.

In general, application processor 20 provides an environment in which a variety of applications may run on source device 12. Example applications include texting applications, email applications, video or picture slideshow applications, presentation applications, video conferencing applications, and the like. Application processor 22 may receive data for use by these applications from external memory 26, local memory 28, cache 46, and/or sensor 50. Sensor 50 may comprise an image sensor used for camera or video applications, or another type of sensor or user-interface built into source device 12.

To present the application data on source device 12, audio processor 34 processes the audio data for presentation on speakers 36 and display processor 30 processes the video data for presentation on local display 32. In addition, as described above, display processor 30 may process and encode the video data for presentation on external display 20 according to an encoding process selected based on a display mode of the video data. The techniques for display mode based video encoding are described in more detail with respect to FIGS. 3 and 4.

In some cases, the data stored in external memory 26 may be received from external storage device 54, such a flash drive, via peripheral interface 52, e.g., an universal serial bus (USB) interface or a SD card interface. Data stored in external memory 26 may also be received from storage or in real-time from a private network or a public network, e.g., the Internet, via connection processor 38. Connection processor 38 manages connections of source device 12, including a 3G or 4G modem connection, a Wi-Fi connection, a global positioning system (GPS) connection, and/or a Bluetooth connection. Application data manager 40 may move data for the applications from external memory 26 and local memory 28 for easier access by application processor 22. In addition, GPU 24 may perform any graphics processing for video game applications or other applications that require 3D representations.

Source device 12 also includes battery monitoring system 44 that monitors a battery status of source device 12. Battery monitoring system 44 may store battery status information that reflects whether source device 12 is wall plugged or using its battery reserve, and if using the battery reserve, the level of remaining battery power. In some cases, the battery status information may be displayed to the user of source device 12, e.g., using a small battery icon, lights or sounds to indicate different battery conditions. Battery monitoring system 44 may update the battery status information almost continuously to reflect an accurate battery status to the user of source device 12.

The components of source device 12 illustrated in FIG. 2 are merely exemplary. In other examples, source device 12 may include more, fewer, and/or different components. The components of source device 12 may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. Local display 32 in source device 12 and external display 20 in sink device 16 may each comprise one of a variety of display devices such as a liquid crystal display (LCD), a plasma display, an organic light emitting diode (OLED) display, or another type of display device.

External memory 26 and local memory 28 in source device 12 may comprise any of a wide variety of volatile or non-volatile memory, including but not limited to random access memory (RAM) such as synchronous dynamic random access memory (SDRAM), read-only memory (ROM), non-volatile random access memory (NVRAM), electrically erasable programmable read-only memory (EEPROM), FLASH memory, and the like. External memory 26 and local memory 28 may comprise computer-readable storage media for storing media data, as well as other kinds of data. External memory 26 and local memory 28 additionally store instructions and program code that are executed by application processor 22 and/or display processor 30 as part of performing the techniques described in this disclosure.

Figure 3:
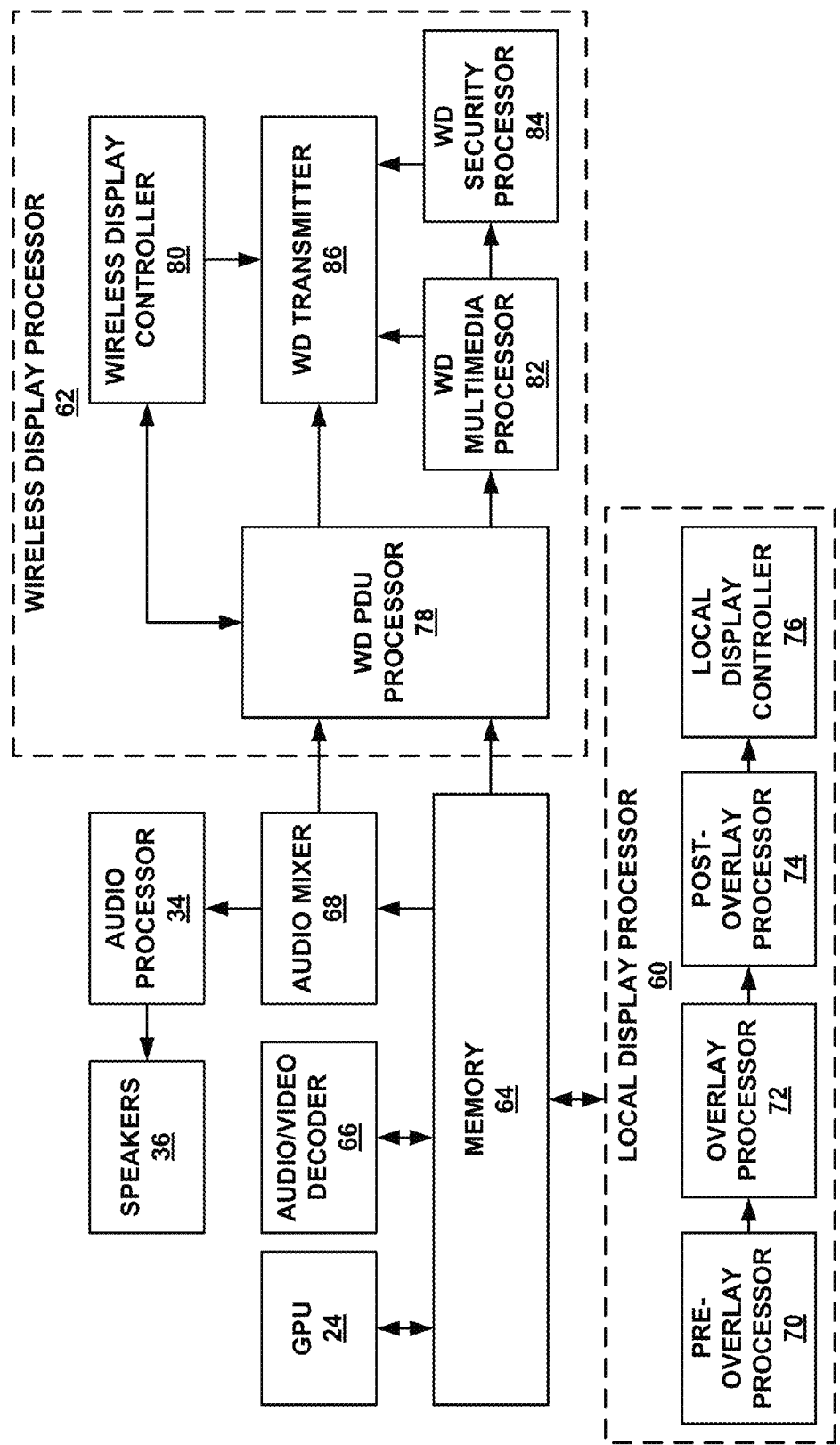
FIG. 3 is a block diagram illustrating a local display processor and a wireless display processor within the source device from FIG. 1.

FIG. 3 is a block diagram illustrating a local display processor 60 and a wireless display processor 62 within source device 12 from FIG. 1. As described above with respect to FIG. 2, display processor 30 within source device 12 may include both local display processor 60 to process video data for presentation on local display 32 in source device 12, and wireless display processor 62 to process and encode video data for transmission to external display 20 in sink device 16 from FIG. 1. In some cases, local display processor 60 may process the same video data as wireless display processor 62 such that the same video data will be displayed at source device 12 and sink device 16. In other cases, local display processor 60 and wireless display processor 62 may process different video data.

As illustrated in FIG. 3, both local display processor 60 and wireless display processor 62 may be connected to memory 64. Memory 64 may include one or more of external memory 26 and local memory 28 from FIG. 2. Memory 64 may store media data, e.g., AV data, video data, and/or audio data from a variety of sources to be processed for display via one or more both of local display processor 60 and wireless display processor 62. For example, memory 64 may store media data processed by GPU 24 and/or media data decoded by audio/video decoder 66. To present the data on source device 12, audio processor 34 receives the audio data after processing by an audio mixer 68 and further processes the audio data for presentation on speakers 36. In addition, local display processor 60 receives the video data from memory 64 and processes the video data for presentation on local display 32. Local display processor 60 includes a pre-overlay processor 70, an overlay processor 72, a post-overlay processor 74, and a local display controller 76 to process and control presentation of the video data for local display 32.

To present the media data on sink device 16, wireless display processor 62 receives the audio data after processing by audio mixer 68 and receives the video data from memory 64. Wireless display processor 62 may then process and encode the media data for presentation at sink device 16. Wireless display processor 62 includes a WD packet data unit (PDU) processor 78, a wireless display controller 80, a WD multimedia processor 82, a WD security processor 84, and a WD transmitter 86. WD PDU processor 78 may receive both the audio data and the video data. WD PDU processor 78 may inspect the content of the audio data and the video data. WD multimedia processor 82 receives the audio and video data from WD PDU processor 78 and encodes the media data into packets for transport to sink device 16 via WD transmitter 86. WD security processor 84 may determine and apply any security information to the media data packets necessary for secure transmission to sink device 16 by WD transmitter 86.

As described above, the video encoding and transmission performed by wireless display processor 62 in source device 12 consumes a large amount of battery power. This is especially the case when performing high bit-rate video encoding in a short period of time in order to provide high quality of service and experience to users of WD system 10. The amount of battery power consumption in source device 12 is of paramount concern, particularly when source device 12 is not wall-plugged. The techniques described herein reduce battery usage by wireless display processor 62 in source device 12 by reducing an amount of video content processing and compression during the encoding process for transmission of video data to sink device 16. More specifically, wireless display controller 80 reduces an amount of video content processing and compression performed by wireless display processor 62 when processing static video data without sacrificing encoding quality when processing dynamic video data. In this way, users of WD system 10 will receive high-quality of service and experience with respect to dynamic video data, while conserving battery power with respect to static video data when high quality video encoding is not necessary.

According to the techniques of this disclosure, wireless display controller 80 selects an encoding process based on whether the video data to be encoded is in a static display mode or a dynamic display mode. Wireless display controller 80 may receive content information regarding the video data from WD PDU processor 78, and determine the display mode of the video data based on whether the content information indicates that the video data includes static content over a period of time or dynamic content over a period of time. For example, static content may include content that is displayed for a defined period of time without changing, such as a user interface, a still photograph, a document, a presentation slide, a web page, or a paused video. The defined period of time may comprise a number of consecutive frames or a number of seconds. In some examples, the defined period of time may be a number of frames in fixed increments. In other examples, the defined period of time may be a number of frames in a rolling window of frames. Dynamic content may include content that is displayed for a defined period of time with continuous changes, e.g., from frame to frame, such as a playing video or a video game.

When the video data is in the static display mode, i.e., the video data includes static content over a period of time, wireless display controller 80 selects a static encoding process that reduces an amount of video data processing and compression, which in turn reduces battery usage at source device 12. For example, wireless display controller 80 may adjust video hierarchy values to reduce a number of intra-encoded video frames for the video data. The video hierarchy values include one or more of a GOP size, a video sequence start position, a picture type, and a slice type. In addition, when the static encoding process is selected, wireless display controller 80 may instruct wireless display processor 62 to inter-encode video frames of the video data as skip-mode frames without performing motion estimation. As an example, wireless display controller 80 may adjust the video hierarchy values for the static video data to expand the GOP size to include all static video frames over a period of time in a single GOP, and adjust the picture or slice types within the GOP to only include a single reference frame and then skip-mode frames that replay the reference frame.

When the video data is in the dynamic mode, i.e., the video data includes dynamic content over a period of time, wireless display controller 80 may select a conventional dynamic encoding process. More specifically, wireless display controller 80 selects a dynamic encoding process and instructs wireless display processor 62 to encode the video data using intra-encoded video frames as often as necessary, and otherwise using inter-encoding video frames using motion estimation. In this case, wireless display controller 80 may use the video hierarchy values specified by a video coding standard used by source device 12 and sink device 16.

Wireless display processor 62 then encodes the video data according to the encoding process selected based on the display mode of the video data, and WD transmitter 86 transmits the encoded video data to sink device 16 for presentation on display 20. Wireless display controller 80 selects the static encoding process when the video data is in the static display mode, and selects the dynamic encoding process when the video data is in the dynamic display mode. In this way, the techniques may reduce power consumption in source device 12 when processing static video data without sacrificing display quality of dynamic video data at sink device 16.

Figure 4:
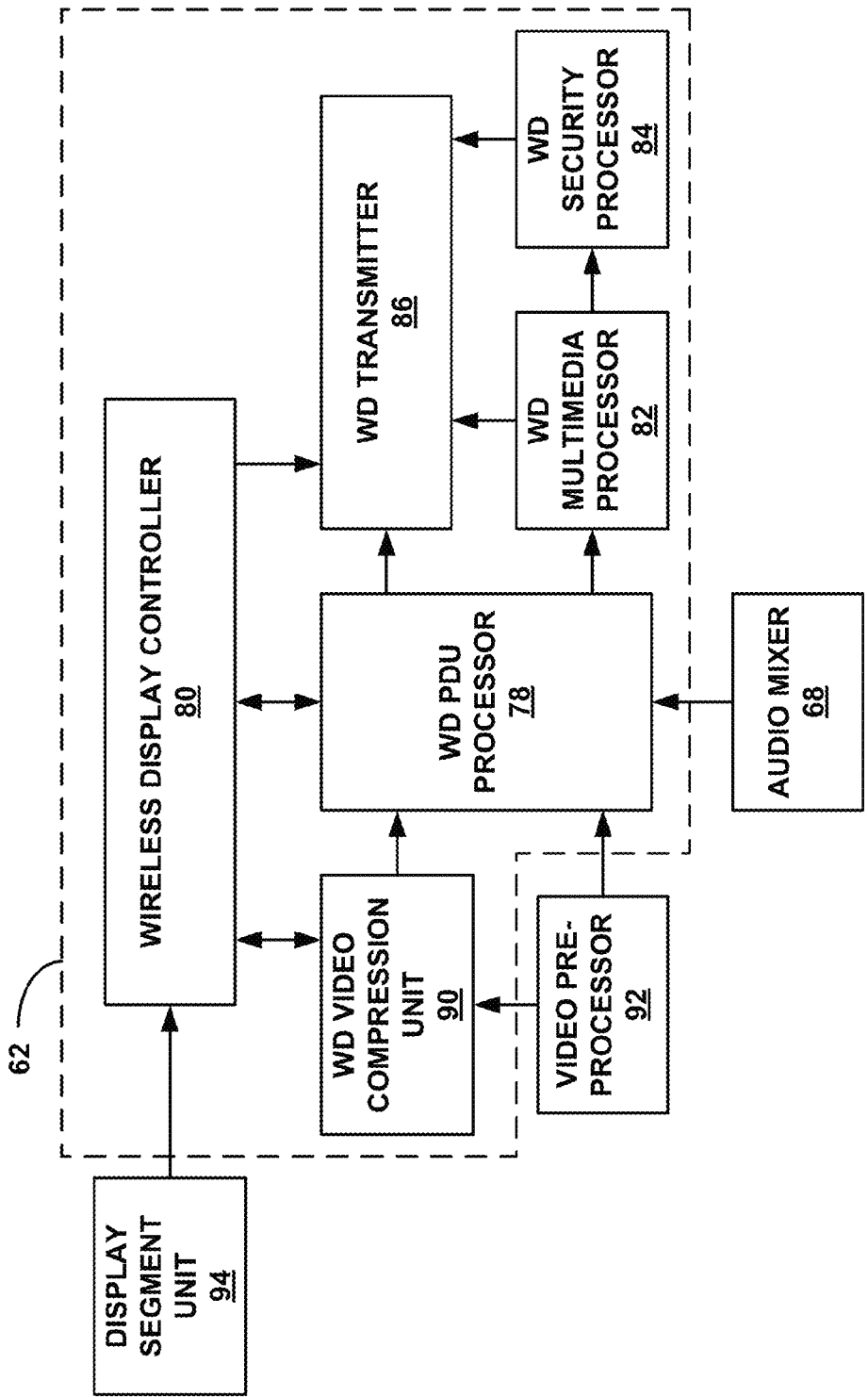
FIG. 4 is a block diagram illustrating the wireless display processor from FIG. 3 including a wireless display control capable of selecting an encoding process based on a display mode of video data to be encoded, and a WD video compression unit capable of encoding the video data according to the selected encoding process.

FIG. 4 is a block diagram illustrating wireless display processor 62 from FIG. 3 including wireless display controller 80 capable of selecting an encoding process based on a display mode of video data to be encoded, and a WD video compression unit 90 capable of encoding the video data according to the selected encoding process. According to the techniques of this disclosure, wireless display controller 80 instructs WD video compression unit 90 to perform a reduced amount of video content processing and compression when processing static video data, and to perform conventional video content processing and compression when processing dynamic video data. In this way, users of WD system 10 will receive high-quality of service and experience with respect to dynamic video data, while conserving battery power with respect to static video data when high quality video encoding is not necessary.

Similar to FIG. 3, FIG. 4 illustrates wireless display processor 62 including WD PDU processor 78, wireless display controller 80, WD multimedia processor 82, WD security processor 84, and WD transmitter 86. WD PDU processor 78 receives audio data after processing by audio mixer 68 and receives video data after processing by a video pre-processor 92 within source device 12. WD PDU processor 78 may inspect the content of the audio data and the video data. For example, WD PDU processor 78 may buffer the video data and view the video frames in order to determine if the content is static or dynamic. WD multimedia processor 82 receives the audio and video data from WD PDU processor 78 and encodes the media data into packets for transport to sink device 16 via WD transmitter 86. WD security processor 84 may determine and apply any security information to the media data packets necessary for secure transmission to sink device 16 by WD transmitter 86.

As described above, wireless display controller 80 selects an encoding process based on whether the video data to be encoded is in a static display mode or a dynamic display mode. Wireless display controller 80 may receive content information regarding the video data from WD PDU processor 78, and determine the display mode of the video data based on whether the content information indicates that the video data includes static content over a period of time or dynamic content over a period of time. Based on the content information, wireless display controller 80 may decide to encode the video data using a particular process in order to reduce battery consumption when the video data includes static content.

For example, static content may include content that is displayed for a defined period of time, e.g., over a series of consecutive frames or a series of seconds, without changing, such as a user interface, a still photograph, a document, a presentation slide, a web page, or a paused video. Dynamic content may include content that is displayed for a defined period of time with continuous changes, e.g., from frame to frame, such as a playing video or a video game. Based on the received content information, wireless display controller 80 determines a display mode, i.e., static mode or dynamic mode, of the video data.

When the video data is in the static display mode, i.e., the video data includes static content over a period of time, wireless display controller 80 selects a static encoding process that reduces an amount of video data processing and compression, which in turn reduces battery usage at source device 12. For example, wireless display controller 80 may adjust video hierarchy values to reduce a number of intra-encoded video frames for the video data. The video hierarchy values include one or more of a GOP size, a video sequence start position, a picture type, and a slice type. In addition, when the static encoding process is selected, wireless display controller 80 may instruct wireless display processor 62 to inter-encode video frames of the video data as skip-mode frames without performing motion estimation.

In some examples, when wireless display controller 80 selects the static encoding process for the video data, wireless display controller 80 may be selecting a specific encoding process with preconfigured video hierarchy values to reduce an amount of video data processing and compression. In other examples, wireless display controller 80 may be selecting a general encoding process with adjustable video hierarchy values. In this case, the static encoding process selected by wireless display controller 80 may vary depending on the actual video data to be encoded.

In a conventional video encoding process, an anchor or intra-coded, i.e., I, frame is sent at the beginning of each GOP and subsequent frames in the GOP may be inter-coded, i.e., P or B, frames predicted from the anchor frame or other previously encoded frames. Encoding the anchor frame consumes a large amount of power because all the video content must be directly encoded and not predicted from content in previously encoded frames.

According to the techniques, when the static encoding process is selected, wireless display controller 80 may adjust the video hierarchy values for the static video data to expand the GOP size to include more video frames than would ordinarily be included in a standard-sized GOP. For example, the GOP size may be expanded to include all video frames over a period of static content in a single GOP. WD video compression unit 90 will still only intra-encode a single anchor frame at the beginning of the expanded GOP. In this way, wireless display controller 80 may reduce a number of intra-coded video frames for the static video data by increasing the number of video frames included in a single GOP. In some cases, when source device 12 is wall-plugged, such that power consumption is less of a concern, the GOP size may be shortened in order to increase reliability of the communication channel between source device 12 and sink device 16.

Also, in a conventional video encoding process, WD video compression unit 90 performs motion estimation to select a previously encoded frame that most closely predicts a current frame to be encoded. In some cases, if no differences are determined between the previous frame and the current frame, the current frame may be encoded as a skip-mode frame to instruct a decoder to simply reuse the content of the previous frame for the current frame. When the video data includes static content, it becomes redundant for WD video compression unit 90 to perform motion estimation for each video frame of the static content.

According to the techniques described in this disclosure, when the static encoding process is selected, wireless display controller 80 may also adjust the picture or slice types within a GOP to only include a single anchor frame and skip-mode frames that replay the anchor frame. WD video compression unit 90 may then automatically encode static video frames as skip-mode frames without performing motion estimation. For example, WD video compression unit 90 may intra- or inter-encode a reference frame of the static video data in the GOP, and then signal an indication that the subsequent video frames in the GOP are encoded as skip-mode frames with respect to the previously encoded reference frame. Skip-mode frames do not include any texture data or motion information. The skip-mode frames instead refer back to the previous reference frame and replicate the content from that reference frame. In other examples, at least some of the subsequent video frames in the GOP may be encoded as predicted, i.e., P or B, frames with motion estimation with respect to the reference frame. In this way, wireless display controller 80 may reduce an amount of video data compression performed for the static video data by reducing or eliminating motion estimation from the inter-coded frames.

In addition, when the static encoding process is selected, wireless display controller 80 may eliminate retransmission of the skip-mode frames when an acknowledgement is not received from sink device 16. Conventionally, if source device 12 does not receive an acknowledgement that sink device 16 received the transmitted video data, source device 12 may retransmit the video data until an acknowledgment is received. According to the techniques described in this disclosure, wireless display controller 80 may instruct wireless display transmitter 86 to not retransmit the skip-mode frames to sink device 16 when an acknowledgement is not received. Eliminating the retransmission will have a negligible effect on the video quality presented on display 20 at sink device 16 because the skip-mode frames are merely duplicates of previous reference frames and include no new video content. In addition, eliminating the retransmission may reduce power consumption in source device 12 from repeated transmissions of the same information.

When the video data is in the dynamic mode, i.e., the video data includes dynamic content over a period of time, wireless display controller 80 may select a conventional dynamic encoding process. More specifically, wireless display controller 80 selects a dynamic encoding process and instructs wireless display processor 62 to encode the video data using intra-encoded video frames as often as necessary, and otherwise using inter-encoding video frames using motion estimation. In this case, wireless display controller 80 may use the video hierarchy values specified by a video coding standard used by source device 12 and sink device 16.

In some examples, only one portion of the content included in the video data may be changing over a period of time while the remaining portions of the video data content remain static. In that case, it may be advantageous to encode only the dynamic portion of the video data using a dynamic encoding process, and encode the rest of the video data using a static encoding process. In this way, battery consumption in source device 12 may be reduced while maintaining the high-quality encoding and display for the dynamic portions of the video data.

The techniques of this disclosure allow the video data to be broken or divided into two or more display segments that correspond to different areas of a display device, e.g., external display 20 in sink device 16. In the illustrated example of FIG. 4, source device 12 may include a display segment unit 94 that determines whether source device 12 is operating in a display segment mode and, if so, determines information regarding the size and location of the display segments. Display segment unit 94 then sends the display segment information to wireless display controller 80. When source device 12 is operating in the display segment mode, wireless display controller 80 determines a display mode for the video data included in each of the two or more display segments. In addition, wireless display controller 80 selects an encoding process for the video data in each of the display segments based on the associated display mode.

In some cases, the size and location of the display segments may be determined dynamically based on a location of dynamic content in the video data during a given period of time. In other cases, the size and location of the display segments may be predetermined according to an application running on video source 12 for which the video data is being generated, or according to the video coding standard used by video source 20 and sink device 16. As one example, the two or more display segments may include a header display segment that includes video data presented along a top-portion of a display device, a main display segment that includes video data presented in a middle-portion of a display device, and a footer display segment that includes video data presented along a bottom-portion of a display device. In other examples, the video data may be divided into display segments corresponding to different portions of a display device.

Continuing the above example, video data within the header display segment may include dynamic status indicators for source device 12, such as power and network signal strength indicators. Video data within the footer display segment may include static menu icons. Video data within the main display segment may include static or dynamic content. In this case, wireless display controller 80 may always select the dynamic encoding process for the video data included in the header display segment to keep the status indicators consistently accurate. In addition, wireless display controller 80 may always select the status encoding process for the video data included in the footer display segment to reduce battery consumption by WD video compression unit 90 when processing the static menu icons. Wireless display controller 80 may decide whether to select the status encoding process or the dynamic encoding process depending on the content information for the video data included in the main display segment.

Once wireless display controller 80 selects the encoding mode for the video data to be encoded, WD video compression unit 90 included in wireless display processor 62 compresses the video data according to the selected encoding process. WD video compression unit 90 is described in more detail with respect to FIG. 5. WD multimedia processor 82 receives the compressed video data from WD video compression unit 90 via WD PDU processor 78. WD multimedia processor 82 encodes the compressed video data into packets for transport by WD transmitter 86. WD transmitter 86 transmits the encoded video data to sink device 16 for presentation on display 20. Wireless display controller 80 selects the static encoding process when the video data is in the static display mode, and selects the dynamic encoding process when the video data is in the dynamic display mode. In this way, by reducing the amount of video content processing and compression performed for static video content, the techniques reduce power consumption in source device 12 without sacrificing display quality of dynamic video content.

Video source 12 may signal the selected encoding process used by WD video compression unit 90 to encode the video data to sink device 16. In this way, a sink device 16 may apply a reciprocal decoding process to decode the video data for presentation on display 20. In some cases, source device 12 may receive status information back from sink device 16 via an independent channel established between source device 12 and sink device 16. For example, the independent channel may comprise the UIBC or another reverse channel architecture. Wireless display controller 80 may use the received status information to adjust the selected encoding process for the video data. The received status information may include at least one of display capability profiles, display related adjustments, and display use status from sink device 16.

Figure 5:
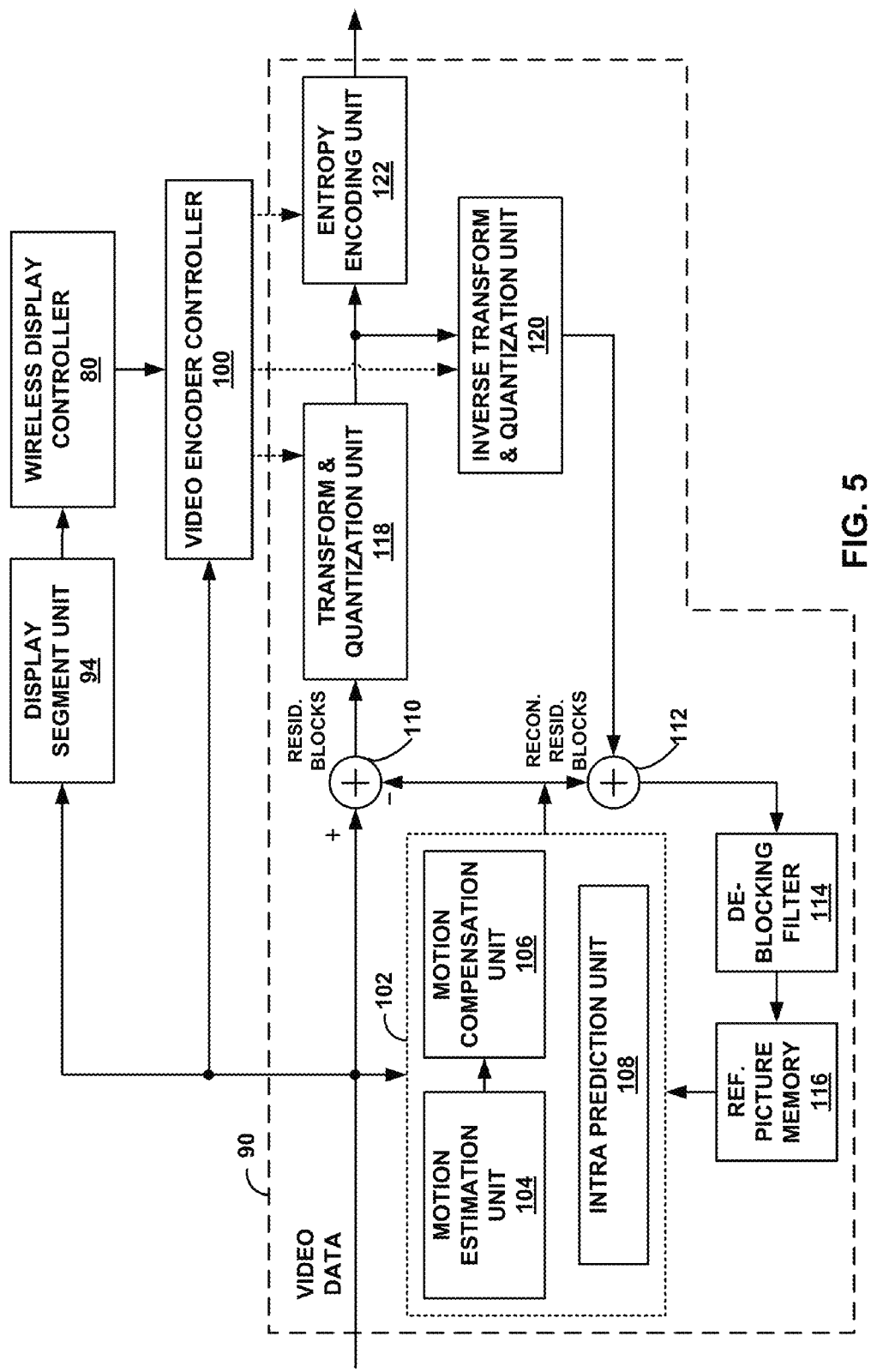
FIG. 5 is a block diagram illustrating the WD video compression unit from FIG. 4 in more detail.

FIG. 5 is a block diagram illustrating WD video compression unit 90 from FIG. 4 in more detail. As described above, wireless display controller 80 selects an encoding process based on whether the video data to be encoded is in a static display mode or a dynamic display mode. Based on the selected encoding mode, wireless display controller 80 may adjust video hierarchy values, including one or more of a GOP size, a video sequence start position, a picture type, and a slice type, used by video encoder controller 100 to control encoding by WD video compression unit 90.

Wireless display controller 80 instructs WD video compression unit 90 to perform a reduced amount of video content processing and compression when processing static video data, and to perform conventional video content processing and compression when processing dynamic video data. In this way, users of WD system 10 will receive high-quality of service and experience with respect to dynamic video data, while conserving battery power with respect to static video data when high quality video encoding is not necessary.

Wireless display controller 80 may receive content information and, in some cases, segment information regarding the video data and determine the display mode of the video data based on whether the content information indicates that the video data includes static content over a period of time or dynamic content over a period of time. As illustrated in FIG. 5, display segment unit 94 determines whether source device 12 is operating in a display segment mode. When source device 12 is operating in display segment mode, display segment unit 94 determines segment information regarding the size and location of the display segments for the video data.

Display segment unit 94 then sends the display segment information to wireless display controller 80. When source device 12 is operating in the display segment mode, wireless display controller 80 determines a display mode for the video data included in each of the two or more display segments. In addition, wireless display controller 80 selects an encoding process for the video data in each of the display segments based on the associated display mode.

When the video data is in the static display mode, i.e., the video data includes static content over a period of time, wireless display controller 80 selects a static encoding process that reduces an amount of video data processing and compression, which in turn reduces battery usage at source device 12. When the video data is in the dynamic mode, i.e., the video data includes dynamic content over a period of time, wireless display controller 80 may select a conventional dynamic encoding process. More specifically, wireless display controller 80 selects a dynamic encoding process and instructs wireless display processor 62 to encode the video data using intra-encoded video frames as often as necessary, and otherwise inter-encoding video frames using motion estimation.

For example, when the static encoding process is selected, wireless display controller 80 may adjust the video hierarchy values used by video encoder controller 100 to control the encoding process performed by WD video compression unit 90. More specifically, wireless display controller 80 may increase a size of the GOP to reduce a number of intra-encoded video frames for the video data. In addition, wireless display controller 80 may adjust the picture and slice types of the video frames within the GOP to include more skip-mode frames to reduce an amount of motion estimation performed by WD video compression unit 90.

Video encoder controller 100, in turn, controls the operation of WD video compression unit 90 based on the video hierarchy values. As illustrated in FIG. 5, video encoder controller 100 may specifically control the operation of transform & quantization unit 118, inverse transform & quantization unit 120, and entropy encoding unit 122. WD video compression unit 90 then encodes the video data according to the selected encoding process implemented via video encoder controller 100.

WD video compression unit 90 may perform intra- and inter-coding of the video data. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 5, WD video compression unit 90 includes a prediction unit 102, summer 110, reference picture memory 116, transform & quantization unit 118, and entropy encoding unit 122. Prediction unit 102 includes motion estimation unit 104, motion compensation unit 106, and intra prediction unit 108. For video block reconstruction, WD video compression unit 90 also includes inverse transform & quantization unit 120, summer 112, and de-blocking filter 114. Deblocking filter 114 may filter block boundaries to remove blockiness artifacts from reconstructed video.

As shown in FIG. 5, WD video compression unit 90 receives current video data to be encoded. Prediction unit 102 may select one of the coding modes, intra or inter, for the current video block based on error results, and provide the resulting intra- or inter-coded block to summer 110 to generate residual block data and to summer 112 to reconstruct the encoded block for use as a reference picture. Intra prediction unit 108 may perform intra-predictive coding of the current video block relative to one or more neighboring blocks in the same frame or slice as the current block to be coded to provide spatial compression. Motion estimation unit 104 and motion compensation unit 106 perform inter-predictive coding of the current video block relative to one or more predictive blocks in one or more reference pictures to provide temporal compression. In the case of a skip-mode video frame, motion estimation unit 104 and motion compensation unit 106 may be bypassed entirely.

Motion estimation unit 104 may be configured to determine the inter-prediction mode for a video slice according to a predetermined pattern for a video sequence. The predetermined pattern may designate video slices in the sequence as P slices, B slices or GPB slices. Motion estimation unit 104 and motion compensation unit 106 may be highly integrated, but are illustrated separately for conceptual purposes. Motion estimation, performed by motion estimation unit 104, is the process of generating motion vectors, which estimate motion for video blocks. A motion vector, for example, may indicate the displacement of a prediction unit of video block within a current video frame or picture relative to a predictive block within a reference picture stored in reference picture memory 116.

Motion estimation unit 104 sends the calculated motion vector to entropy encoding unit 122 and motion compensation unit 106. Motion compensation, performed by motion compensation unit 106, may involve fetching or generating the predictive block based on the motion vector determined by motion estimation. Upon receiving the motion vector for the prediction unit of the current video block, motion compensation unit 106 may locate the predictive block to which the motion vector points. WD video compression unit 90 forms a residual video block by subtracting pixel values of the predictive block from the pixel values of the current video block being coded, forming pixel difference values. The pixel difference values form residual data for the block, and may include both luma and chroma difference components. Summer 110 represents the component or components that perform this subtraction operation.

The residual video data in the residual block may be applied to transform & quantization unit 118. Transform & quantization unit 118 transforms the residual video data into residual transform coefficients using a transform, such as a discrete cosine transform (DCT) or a conceptually similar transform. Transform and quantization unit 118 may convert the residual video data from a pixel domain to a transform domain, such as a frequency domain. Transform & quantization unit 118 then quantizes the transform coefficients to further reduce bit rate. The quantization process may reduce the bit depth associated with some or all of the coefficients. The degree of quantization may be modified by adjusting a quantization parameter.

Following quantization, entropy encoding unit 122 perform a scan of the matrix including the quantized transform coefficients and entropy encodes the quantized transform coefficients. For example, entropy encoding unit 122 may perform context adaptive variable length coding (CAVLC), context adaptive binary arithmetic coding (CABAC), or another entropy encoding technique. Following the entropy encoding by entropy encoding unit 122, the encoded bitstream may be transmitted to a video decoder at sink device 16, or archived for later transmission or retrieval by the video decoder at sink device 16.

Inverse transform & quantization unit 120 applies inverse quantization and inverse transformation to reconstruct the residual block in the pixel domain for later use as a reference block of a reference picture. Motion compensation unit 106 may calculate a reference block by adding the residual block to a predictive block of one of the reference pictures within reference picture memory 116. Motion compensation unit 106 may also apply one or more interpolation filters to the reconstructed residual block to calculate sub-integer pixel values for use in motion estimation. Summer 112 adds the reconstructed residual block to the motion compensated prediction block produced by motion compensation unit 106 to produce a reference block. The reference block is then applied to deblocking filter 114 and stored in reference picture memory 116. The reference block may be used by motion estimation unit 104 and motion compensation unit 106 as a reference block to inter-predict a block in a subsequent video frame or picture.

Figure 6:
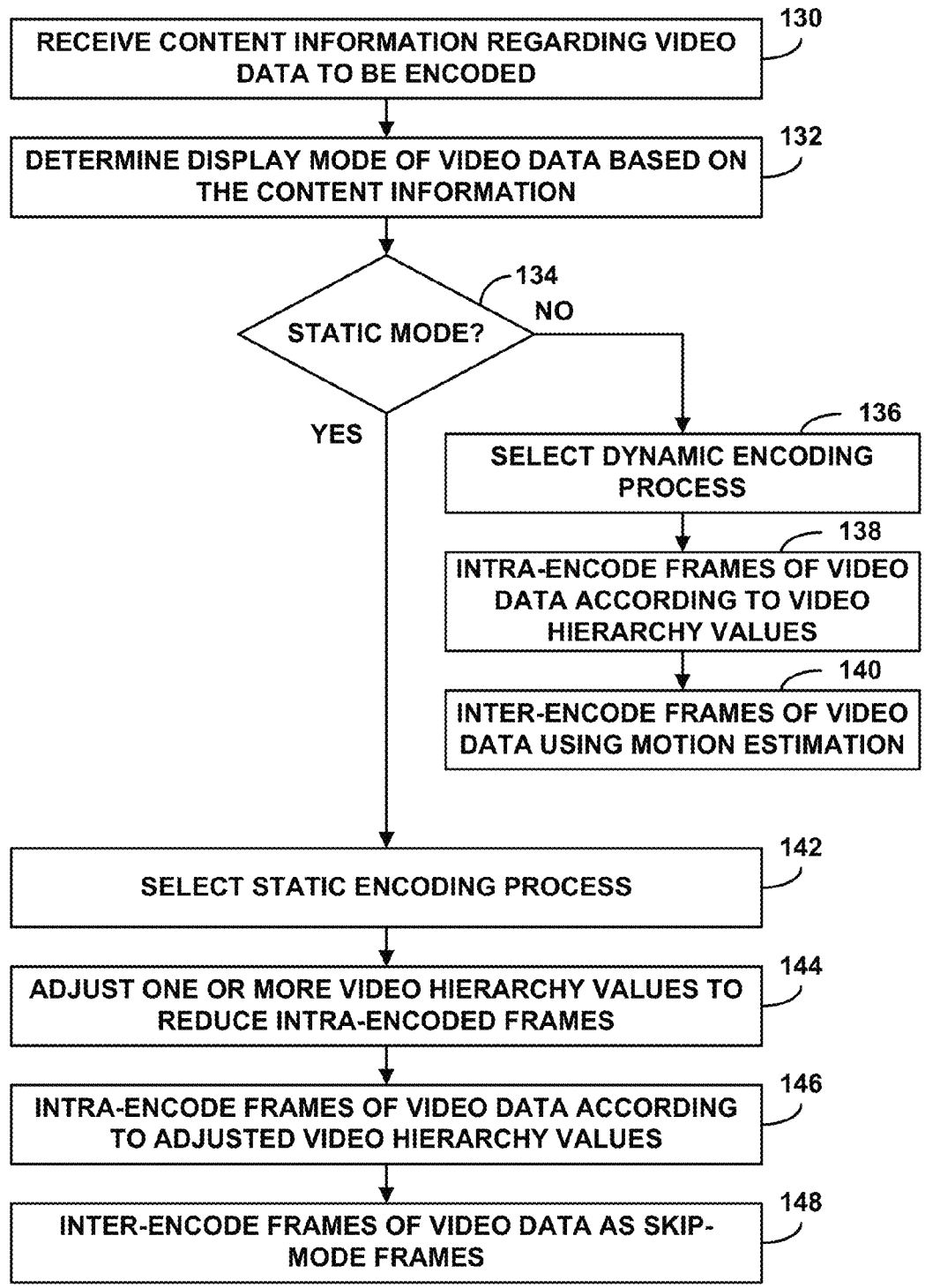
FIG. 6 is a flowchart illustrating an exemplary technique of selecting an encoding process based on a display mode of video data to be encoded, and encoding the video data according to the selected encoding process.

FIG. 6 is a flowchart illustrating an exemplary technique of selecting an encoding process based on a display mode of video data to be encoded, and encoding the video data according to the selected encoding process. The technique illustrated in FIG. 6 will be described in relation to one or more components of wireless display processor 62 of FIGS. 3-5.

Wireless display controller 80 within wireless display processor 62 receives content information regarding video data to be encoded from WD PDU processor 78 (130). Wireless display controller 80 then determines a display mode of the video data based on the content information (132). Wireless display controller 80 may determine the display mode of the video data based on whether the content information indicates that the video data includes static content over a period of time or dynamic content over a period of time. The period of time may be a number of consecutive frames or a number of seconds. In some examples, the period of time may be a number of frames in fixed increments. In other examples, the period of time may be a number of frames in a rolling window of frames. Static content may include content that is displayed for a defined period of time without changing, such as a user interface, a still photograph, a document, a presentation slide, a web page, or a paused video. Dynamic content may include content that is displayed for a defined period of time with continuous changes, such as a playing video or a video game.

In some cases, when source device 12 is operating in the display segment mode, wireless display controller 80 may also receive segment information regarding size and location of different segments of the video data that correspond to different areas of a display device. In this example, wireless display controller 80 determines a display mode for the video data included in each of the display segments.

When the video data is in the dynamic mode (NO branch of 134), wireless display controller 80 selects a dynamic encoding process (136). When the dynamic encoding process is selected, wireless display controller 80 may make no adjustments to the video hierarchy values in video encoder controller 100. WD video compression unit 90, therefore, may intra-encode video frames of the video data according to the existing video hierarchy values specified for the video compression standard (138). In addition, WD video compression unit 90 may inter-encode video frames of the video data using motion estimation according to the video compression standard (140).

When the video data is in the static mode (YES branch of 134), wireless display controller 80 selects a static encoding process (142). When the static encoding process is selected, wireless display controller 80 may adjust one or more of the video hierarchy values in video encoder controller 100 to reduce a number of intra-encoded frames for the video data (144). WD video compression unit 90, therefore, intra-encodes video frames of the video data according to the adjusted video hierarchy values (146). For example, wireless display controller 80 may increase the GOP size to include all video frames during a period of static content. In this way, WD video compression unit 90 intra-encodes only one anchor frame, i.e., a first video frame in coding order, for the extended GOP that include an entire sequence of static video data.

In addition, wireless display controller 80 may adjust the slice and picture types of the video frames in the GOP to include an increased number of skip-mode frames to reduce an amount of motion estimation performed by WD video compression unit 90. WD video compression unit 90 then inter-encodes video frames in the GOP as skip-mode frames without using motion estimation (148). For example, after intra-encoding the anchor frame for the extended GOP of static video data, WD video compression unit 90 may inter-encode each of the subsequent video frames for the entire sequence of static video data as skip-mode frames to indicate no change from the initial reference frame. In this way, the techniques reduce power consumption in the source device when processing static video data without sacrificing display quality of dynamic video data at the sink devices.

Figure 7:
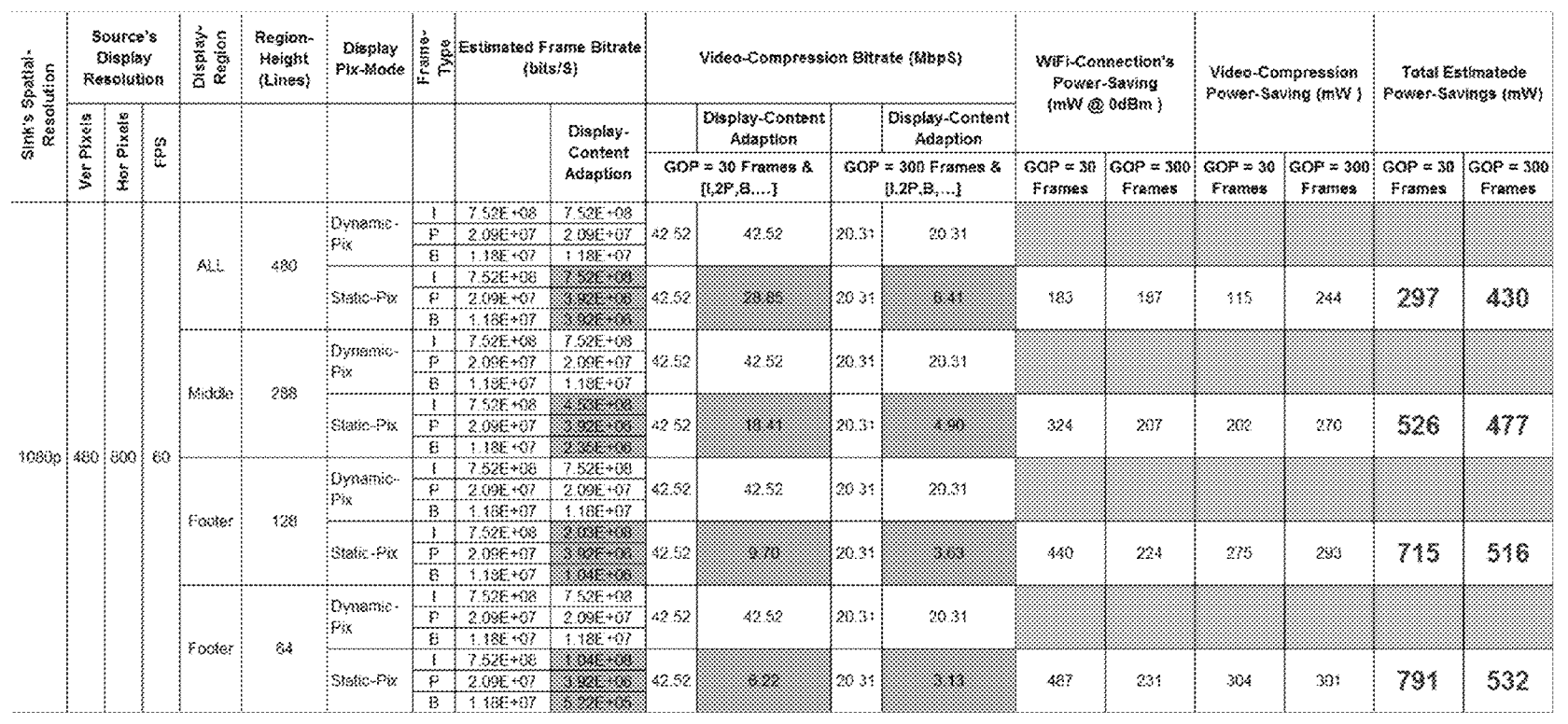

FIG. 7 is a table illustrating example power savings in a source device in WD system 10 using display mode based video encoding to encode video data at source device 12 for a 1080p display at sink device 20. As shown in FIG. 7, the total power savings when encoding static video data ranges from 287 mW to 791 mW.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. In some examples, computer-readable media may comprise non-transitory computer-readable media. Data storage media may be any available media that can be accessed by one or more computers or one or more processors to retrieve instructions, code and/or data structures for implementation of the techniques described in this disclosure.

By way of example, and not limitation, such computer-readable media can comprise non-transitory media such as RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various embodiments of the invention have been described. These and other embodiments are within the scope of the following claims.

What is claimed is:

1. A method of encoding video data comprising:
 processing, with a source device in a Wireless Display (WD) system, video data for display at the source device and display at one or more sink devices in the WD system;
 determining, with the source device, a display mode of the video data to be encoded based on content information of the video data;
 when the display mode of the video data is determined to be a dynamic mode based on the content information indicating that the video data includes dynamic content over a period of time, selecting a first encoding process for the video data;
 when the display mode of the video data is determined to be a static mode based on the content information indicating that the video data includes static content over a period of time, selecting a second encoding process for the video data different from the first encoding process, wherein the second encoding process reduces an amount of video data processing and compression performed by the source device compared to the first encoding process;
 adjusting, with the source device, the selected encoding process for the video data based on status information received from the one or more sink devices via an independent channel,
  wherein the status information includes at least one of display capability profiles, display related adjustments, or display use status of the sink devices; and
 encoding the video data according to the selected encoding process for transmission to the one or more sink devices in the WD system,
  wherein encoding the video data according to the second encoding process comprises inter-encoding video frames of the video data as skip-mode frames without performing motion estimation; and
  wherein encoding the video data according to the first encoding process comprises:
   intra-encoding one or more video frames of the video data according to video hierarchy values specified by a video coding standard used by the source device and the one or more sink devices,
    wherein the video hierarchy values-comprise one or more of a group of pictures (GOP) size, a video sequence start position, a picture type, or a slice type for the video data; and
   inter-encoding other video frames of the video data using motion estimation according to the video coding standard.

2. The method of claim 1, further comprising transmitting the encoded video data to the one or more sink devices in the WD system for display.

3. The method of claim 1, wherein determining a display mode of the video data comprises determining a display mode for the video data in each of two or more display segments that correspond to different areas of a display device at one or more of the sink devices.

4. The method of claim 3, further comprising, when the display mode of the video data in at least one of the display segments of the display device is determined to be the static mode, encoding the video data in the at least one of the display segments according to the second encoding process, and when the display mode of the video data in another one of the display segments of the display device is determined to be the dynamic mode, encoding the video data in the another one of the display segments according to the first encoding process.

5. The method of claim 1, further comprising signaling the selected encoding process for the video data to the sink devices.

6. The method of claim 1, wherein the static content comprises content that is displayed for a defined period of time without changing.

7. The method of claim 1, wherein encoding the video data according to the second encoding process comprises:
 adjusting one or more video hierarchy values to reduce a number of intra-encoded video frames for the video data and reduce motion estimation performance for inter-encoded video frames of the video data compared to the first encoding process, wherein the video hierarchy values comprise one or more of a group of pictures (GOP) size, a video sequence start position, a picture type, or a slice type for the video data;
 intra-encoding one or more video frames of the video data according to the adjusted video hierarchy values; and
 inter-encoding other video frames of the video data as skip-mode frames without performing motion estimation.

8. The method of claim 7, further comprising:
 transmitting the skip-mode frames to the one or more sink devices in the WD system, wherein transmitting the skip-mode frames comprises transmitting an indication to reuse content of a previous frame for the skip-mode frames; and
 eliminating retransmission of the skip-mode frames when an acknowledgement of receipt of the transmitted skip-mode frames is not received from the sink devices.

9. A source device in a Wireless Display (WD) system comprising:
 a memory to store video data; and
 a processor configured to:
  process, with a source device in a Wireless Display (WD) system, video data for display at the source device and display at one or more sink devices in the WD system;

determine, with the source device, a display mode of the video data to be encoded based on content information of the video data;

when the display mode of the video data is determined to be a dynamic mode based on the content information indicating that the video data includes dynamic content over a period of time, select a first encoding process for the video data;

when the display mode of the video data is determined to be a static mode based on the content information indicating that the video data includes static content over a period of time, select a second encoding process for the video data different from the first encoding process, wherein the second encoding process reduces an amount of video data processing and compression performed by the source device compared to the first encoding process;

adjust, with the source device, the selected encoding process for the video data based on status information received from the one or more sink devices via an independent channel, wherein the status information includes at least one of display capability profiles, display related adjustments, or display use status of the sink devices; and encode the video data according to the selected encoding process for transmission to the one or more sink devices in the WD system, wherein encoding the video data according to the second encoding process comprises inter-encoding video frames of the video data as skip-mode frames without performing motion estimation; and wherein, when the first encoding process is selected, the processor:

intra-encodes one or more video frames of the video data according to video hierarchy values specified by a video coding standard used by the source device and the one or more sink devices, wherein the video hierarchy values comprise one or more of a group of pictures (GOP) size, a video sequence start position, a picture type, or a slice type for the video data; and inter-encodes other video frames of the video data using motion estimation according to the video coding standard.

10. The source device of claim 9, further comprising a transmitter that transmits the encoded video data to the one or more sink devices in the WD system for display.

11. The source device of claim 9, wherein the processor determines a display mode for the video data in each of two or more display segments that correspond to different areas of a display device at one or more of the sink devices.

12. The source device of claim 11, wherein, when the display mode of the video data in at least one of the display segments of the display device is determined to be the static mode, the processor encodes the video data in the at least one of the display segments according to the second encoding process, and when the display mode of the video data in another one of the display segments of the display device is determined to be the dynamic mode, the processor encodes the video data in the another one of the display segments according to the first encoding process.

13. The source device of claim 9, wherein the processor signals the selected encoding process for the video data to the sink devices.

14. The source device of claim 9, wherein, when the second encoding process is selected, the processor:

adjusts one or more video hierarchy values to reduce a number of intra-encoded video frames for the video data and reduce motion estimation performance for inter-encoded video frames of the video data compared to the first encoding process, wherein the video hierarchy values comprise one or more of a group of pictures (GOP) size, a video sequence start position, a picture type, or a slice type for the video data;

intra-encodes one or more video frames of the video data according to the adjusted video hierarchy values; and inter-encodes other video frames of the video data as skip-mode frames without performing motion estimation.

15. The source device of claim 14, wherein the processor transmits the skip-mode frames to the one or more sink devices in the WD system with an indication to reuse content of a previous frame for the skip-mode frames, and eliminates retransmission of the skip-mode frames when an acknowledgement of receipt of the transmitted skip-mode frames is not received from the sink devices.

16. A non-transitory, computer-readable medium comprising instructions for encoding video data that cause one or more processor to:

process, with a source device in a Wireless Display (WD) system, video data for display at the source device and display at one or more sink devices in the WD system;

determine, with the source device, a display mode of the video data to be encoded based on content information of the video data;

when the display mode of the video data is determined to be a dynamic mode based on the content information indicating that the video data includes dynamic content over a period of time, select a first encoding process for the video data;

when the display mode of the video data is determined to be a static mode based on the content information indicating that the video data includes static content over a period of time, select a second encoding process for the video data different from the first encoding process, wherein the second encoding process reduces an amount of video data processing and compression performed by the source device compared to the first encoding process;

adjust, with the source device, the selected encoding process for the video data based on status information received from the one or more sink devices via an independent channel, wherein the status information includes at least one of display capability profiles, display related adjustments, and display use status of the sink devices; and encode the video data according to the selected encoding process for transmission to the one or more sink devices in the WD system, wherein when the second encoding process is selected, the instructions cause the processors to inter-encode video frames of the video data as skip-mode frames without performing motion estimation; and further comprising, when the first encoding process is selected, instructions that cause the processors to:

intra-encode one or more video frames of the video data according to video hierarchy values specified by a video coding standard used by the source device and the one or more sink devices, wherein the video hierarchy values comprise one or more of a group of pictures (GOP) size, a video sequence start position, a picture type, or a slice type for the video data; and inter-encode other video frames of the video data using motion estimation according to the video coding standard.

17. The non-transitory, computer-readable medium of claim 16, further comprising instructions that cause the processors to transmit the encoded video data to the one or more sink devices in the WD system for display.

18. The non-transitory, computer-readable medium of claim 16, wherein the instructions cause the processor to determine a display mode for the video data in each of two or more display segments that correspond to different areas of a display device at one or more of the sink devices.

19. The non-transitory, computer-readable medium of claim 16, further comprising instructions that cause the processors to signal the selected encoding process for the video data to the sink devices.

20. The computer-readable medium of claim 16, wherein, when the second encoding process is selected, the instructions cause the processors to:
  adjust one or more video hierarchy values to reduce a number of intra-encoded video frames for the video data and reduce motion estimation performance for inter-encoded video frames of the video data compared to the first encoding process, wherein the video hierarchy values comprise one or more of a group of pictures (GOP) size, a video sequence start position, a picture type, or a slice type for the video data;
  intra-encode one or more video frames of the video data according to the adjusted video hierarchy values; and
  inter-encode other video frames of the video data as skip-mode frames without performing motion estimation.

* * * * *